United States Patent
Wan et al.

(10) Patent No.: US 12,305,120 B2
(45) Date of Patent: May 20, 2025

(54) LOTUS LEAF DERIVED BIOCHAR LOADED WITH ZIF-67, AND PREPARATION METHOD THEREFOR AND APPLICATION METHOD THEREOF

(71) Applicant: Zhengzhou University, Zhengzhou (CN)

(72) Inventors: Hongyou Wan, Zhengzhou (CN); Jingwei Yan, Zhengzhou (CN); Wei Zhang, Zhengzhou (CN); Lin Gong, Zhengzhou (CN); Xinfeng Zhu, Zhengzhou (CN); Chaohai Wang, Zhengzhou (CN); Cong Guo, Zhengzhou (CN)

(73) Assignee: Zhengzhou University, Zhengzhou (CN)

( * ) Notice: Subject to any disclaimer, the term of this patent is extended or adjusted under 35 U.S.C. 154(b) by 161 days.

(21) Appl. No.: 18/358,957

(22) Filed: Jul. 26, 2023

(65) Prior Publication Data
US 2024/0052245 A1 Feb. 15, 2024

(30) Foreign Application Priority Data
Aug. 11, 2022 (CN) .......................... 202210963341.3

(51) Int. Cl.
*C10B 53/02* (2006.01)
(52) U.S. Cl.
CPC .................................. *C10B 53/02* (2013.01)
(58) Field of Classification Search
CPC ......... C10B 53/02; B01J 37/343; B01J 21/18; B01J 2231/70; B01J 2531/0216; B01J 2531/854; B01J 31/1691; B01J 31/1815; C02F 1/281; C02F 1/288; C02F 1/283; C02F 2305/023; C02F 1/725; C02F 2101/306; C02F 2101/30
See application file for complete search history.

(56) References Cited

FOREIGN PATENT DOCUMENTS

CN 108821257 B * 11/2021 ............. C01B 32/05

OTHER PUBLICATIONS

Translation of CN-108821257-B (Year: 2021).*
Liu et al. ("Catalytic pyrolysis of lotus leaves for producing nitrogen self-doping layered graphitic biochar: Performance and mechanism for peroxydisulfate activation", Chemosphere 302 (2022) 134868). (Year: 2022).*

* cited by examiner

Primary Examiner — Ali Z Fadhel

(57) ABSTRACT

A lotus leaf derived biochar loaded with ZIF-67, and a preparation method therefor and an application method thereof are provided, which relate to the field of environmental protection wastewater treatment technologies. The preparation method includes: adding a pretreated lotus leaf carrier and ZIF-67 to methanol as solvent, to obtain a solution, performing an ultrasonic dispersion process on the solution, standing the solution after performing the ultrasonic dispersion process to perform a self-assembly reaction to thus obtain a reacted solution, and drying the reacted solution to obtain the lotus leaf derived biochar loaded with the ZIF-67. Recyclability and reusability of the ZIF-67 are effectively improved by the lotus leaf derived biochar loaded with ZIF-67, and organic pollutants in aqueous solution are degraded by effectively activating peroxymonosulfate.

8 Claims, 3 Drawing Sheets

LOTUS LEAF DERIVED BIOCHAR LOADED WITH ZIF-67, AND PREPARATION METHOD THEREFOR AND APPLICATION METHOD THEREOF

TECHNICAL FIELD

The disclosure relates to the field of environmental protection wastewater treatment technologies, and more particularly to lotus leaf derived biochar loaded with zeolite-imidazolate framework-67 (ZIF-67), a preparation method therefor, and an application method thereof.

BACKGROUND

Levofloxacin belongs to quinolone antibiotics, and the levofloxacin is widely used due to its powerful antibacterial properties. The levofloxacin can be widely detected in wastewater and water environment due to resistance of the levofloxacin to natural degradation. What is more important, propagation of antibiotic resistance genes and antibiotic resistant bacteria is promoted by residual levofloxacin in the water environment, thus causing a serious threat to health of livestock and human. However, a traditional water treatment process cannot effectively eliminate these risks, so as to prompt development of a new technology to thoroughly remove the levofloxacin from the water environment.

Sulfate radical anion has the following inherent advantages: a high oxidation reduction potential, a wide adaptation range of potential of hydrogen (pH), and a long half-life. Therefore, an advanced oxidation technology based on sulfate radical is considered as an efficient and promising technology. Recent studies show that peroxymonosulfate (PMS) can be activated by various transition metals (such as, manganese II abbreviated as Mn (II), ferric II abbreviated as Fe (II), cobalt II abbreviated as Co (II), lithium II abbreviated as Li (II), and copper I abbreviated as Cu (I)). Specifically, the Co (II) has a strong ability to activate the PMS, however, secondary pollution will be caused by dissolving the Co (II) in the water environment, and a potential for reuse of the Co (II) is poor.

A metal-organic frameworks (MOF) can be composed of a metal and an organic ligand in a highly modular manner, and each of the metal and the organic ligand usually has a rich hole structure and a highly crystalline crystal structure. Specifically, zeolite-imidazolate framework-67 (ZIF-67) with highly dispersed Co (II) sites can effectively prevent the leaching of cobalt (Co) ions, and the ZIF-67 has an excellent activation performance for the PMS.

However, there are two main limitations to using the ZIF-67 to activate the PMS.

First, the ZIF-67 exists in a powder form, which makes it difficult to be recovered from aqueous media. In order to solve the problem, the ZIF-67 is often loaded in a substrate. For example, some researchers grow ZIF-67 particles on a foam nickel, which sacrifices the activation performance of a catalyst (i.e., the ZIF-67), but promotes its activity recovery. A reduction of the Co (II) sites inhibits the activation performance of the catalyst. Some researchers prepare ferroferric oxide @ ZIF-67 ($Fe_3O_4$ @ZIF-67) by cladding $Fe_3O_4$ with the ZIF-67. Recyclability of the catalyst is greatly improved by the magnetic $Fe_3O_4$. The Fe (II) can be an electron donor to accelerate a conversion of Co (II) to Co (III), thereby improving the activation performance of the catalyst. However, the Fe (II) cannot be replenished after providing electrons, which leads to gradual deactivation of the catalyst during circulation.

Second, due to a slow electronic transmission capability of the ZIF-67, low reusability for activating the PMS is caused. In order to overcome the limitations, some researchers discover that a reducing sulfur substance can be formed by sulfurized ZIF-67 on a surface of the catalyst. A multivalent sulfur substance can accelerate an electron transfer rate, thereby promoting regeneration of divalent cobalt ion ($Co^{2+}$). However, loss of the sulfur substance can lead to the leaching of $Co^{2+}$.

SUMMARY

Aiming at the above problems, the disclosure provides lotus leaf derived biochar loaded with zeolite-imidazolate framework-67 (ZIF-67), a preparation method therefor, and an application method thereof, so as to improve recyclability and reusability of the ZIF-67, and effectively activate peroxymonosulfate (PMS) to degrade organic pollutants in aqueous solution.

A first purpose of the disclosure is to provide a preparation method of lotus leaf derived biochar loaded with ZIF-67, and the preparation method includes:

adding a pretreated lotus leaf carrier and ZIF-67 to methanol as solvent, to obtain a solution, performing an ultrasonic dispersion process on the solution, standing the solution after performing the ultrasonic dispersion process to perform a self-assembly reaction to thus obtain a reacted solution, and drying the reacted solution to obtain the lotus leaf derived biochar loaded with the ZIF-67.

In an embodiment, a ratio of the pretreated lotus leaf carrier:the ZIF-67:the methanol is 2.5-3.5 grams (g):5-6 g:100 milliliters (ml), and a standing time is 12-24 hours (h).

In an embodiment, an ultrasonic dispersion time is 0.5-2 h.

In an embodiment, a drying temperature is for drying the reacted solution 200-220° C., and a drying time for drying the reacted solution is 4-9 h.

In an embodiment, a preparation method of the pretreated lotus leaf carrier includes: drying a lotus leaf at a temperature of 50-90 Celsius degree (° C.) for 1-5 h to remove moisture therein to thus obtain a dried lotus leaf, and cutting the dried lotus leaf to obtain the pretreated lotus leaf carrier.

A second purpose of the disclosure is to provide the lotus leaf derived biochar loaded with ZIF-67, and the lotus leaf derived biochar loaded with ZIF-67 is obtained by using the above preparation method.

A third purpose of the disclosure is to provide an application method of lotus leaf derived biochar loaded with ZIF-67 in degradation of an antibiotics, and the application method includes: degrading, by using an advanced oxidation technology (which is a well-known technology in the field) based on sulfate radical anion, wastewater including the antibiotic by using the lotus leaf derived biochar loaded with ZIF-67 as a catalyst, and using PMS as an oxidant.

In an embodiment, a ratio of the lotus leaf derived biochar loaded with ZIF-67:the PMS:antibiotic is 0.5-2 grams per liter (g/L):50-150 milligrams per liter (mg/L):1-5 mg/L.

In an embodiment, the antibiotic is levofloxacin, and a value of potential of hydrogen (pH) the wastewater including the antibiotic is 3-9.

In an embodiment, a thickness of the lotus leaf derived biochar loaded with ZIF-67 is 1-3 millimeters (mm), and an effective area of the lotus leaf derived biochar loaded with ZIF-67 is 9-1963.5 square centimeters ($cm^2$).

Compared with the related art, the disclosure has the following beneficial effects.

(1) The disclosure prepares the lotus leaf derived biochar loaded with ZIF-67 to effectively improve recyclability and reusability of the ZIF-67. Firstly, as a macroscopic material, the lotus leaf derived biochar loaded with ZIF-67 can be easily separated from solution, and the lotus leaf derived biochar loaded with ZIF-67 facilitates operation and improves recovery efficiency. Secondly, the disclosure first discovers that a catalytic synergy of the lotus leaf derived biochar and active sites of cobalt (Co) in the ZIF-67. An electron transfer rate between components is improved by a biochar substrate, so as to greatly accelerate conversion between trivalent cobalt ion ($Co^{3+}$) and divalent cobalt ion (Co 2+), and significantly improve reusability of the catalyst. Moreover, a possible reaction mechanism of a lotus leaf derived biochar loaded with ZIF-67 (LLZ)/PMS system is explained by combining a density functional theory (DFT) calculation and liquid chromatography-mass spectrometry (LC-MS) in the disclosure. Research results indicate that levofloxacin (LVF) is degraded by a nucleophilic reaction, and a specific degradation pathway is characterized by the LVF. Applicability of a base material of a metal-organic framework (MOF) in an advanced oxidation technology is proved in the disclosure.

(2) The disclosure uses the lotus leaf derived biochar loaded with ZIF-67 (LLZ) with excellent performance for activating the PMS as the catalyst to degrade refractory the antibiotic (i.e., LVF) in wastewater, so as to efficiently remove the LVF in the wastewater.

(3) The disclosure uses lotus leaf biochar as a substrate, prepares the LLZ, effectively improves an electronic transmission capability of the catalyst, and continuously activates the PMS to degrade the refractory antibiotic (i.e., LVF) in the wastewater, which can achieve 20 rounds of reuse of the LLZ, and has a significant degradation effect.

(4) The disclosure uses the LLZ with excellent performance for activating the PMS as the catalyst, which can effectively resist influence of water environment matrix (such as pH and anion), and has a significant degradation effect.

(5) In technical solutions of the disclosure, the used substrate, i.e., lotus leaf biochar, is easy to obtain, low in cost, and simple in preparation process conditions.

DETAILED DESCRIPTION OF EMBODIMENTS

Figure 1:
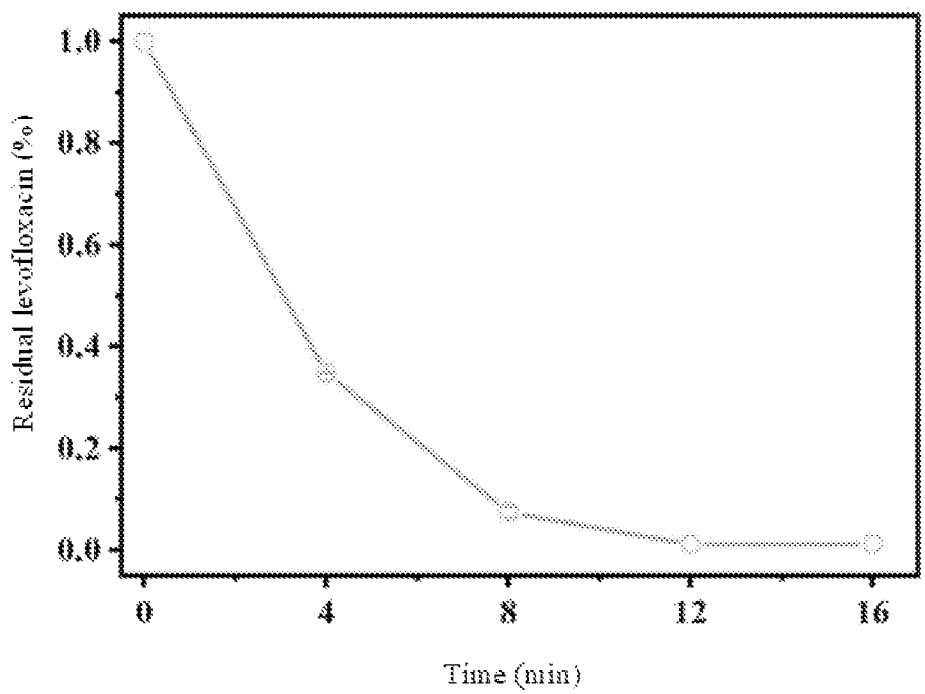
FIG. 1 illustrates a schematic diagram of a degradation result of levofloxacin according to an embodiment 4 of the disclosure.

Technical solutions in embodiments of the disclosure will be clearly and completely described in conjunction with drawings in the embodiments of the disclosure in the follows. Obviously, the described embodiments are merely some embodiments of the disclosure, not all of them. Based on the embodiments of the disclosure, all other embodiments obtained by those skilled in the art without creative works fall within the scope of protection of the disclosure.

When lotus leaf derived biochar loaded with zeolite-imidazolate framework-67 (ZIF-67), which is also referred to as LLZ, is prepared in the disclosure, during a soaking process, a surface of a lotus leaf is covered with a rough layer of wax, which is used as a biochar precursor. Rough surface of the lotus leaf can provide rich loading points for the ZIF-67 by using a simple self-assembly method. During a drying process at a temperature of 200-220 Celsius degree (° C.), a nonanediol wax layer on the surface of the lotus leaf becomes more smoothly after recrystallization during drying, and a sample of the LLZ is successfully obtained in the end.

Embodiment 1

The embodiment 1 includes steps S1 and S2.

In step S1, pretreated steps for a lotus leaf carrier are as follows. Specifically, the lotus leaf is dried at a temperature of 60° C. for 3 hours (h) to remove moisture therein, after drying, the lotus leaf is cut to obtain square thin slices, each of which has a thickness of 1-3 millimeters (mm), a length of 3 centimeters (cm), and an effective area of 9 square centimeters ($cm^2$), and thus a pretreated lotus leaf carrier is obtained.

In step S2, 2.5 grams (g) of pretreated lotus leaf carrier obtained from S1 is added into a beaker containing with 100 milliliters (ml) of a methanol solution, then 5 g of ZIF-67 is added into the beaker to perform an ultrasonic dispersion process for 30 minutes (min), then the ZIF-67 is self-assembled on a surface of the pretreated lotus leaf carrier after standing for 12 h, and then is placed in an air blast oven after self-assembling on the surface of the pretreated lotus leaf carrier for drying at a temperature of 200° C. for 4 h, to obtain a lotus leaf derived biochar loaded with ZIF-67, and the lotus leaf derived biochar loaded with ZIF-67 is recorded as LLZ.

Embodiment 2

The embodiment 2 includes steps S1 and S2.

In step S1, the pretreated steps for a lotus leaf carrier are as follows. Specifically, the lotus leaf is dried at a temperature of 50° C. for 5 h to remove moisture therein, after drying, the lotus leaf is cut to obtain square thin slices, each of which has a thickness of 1-3 mm, a length of 3 cm, and an effective area of 9 $cm^2$, and thus the pretreated lotus leaf carrier is obtained.

In step S2, 3 g of pretreated lotus leaf carrier obtained from S1 is added into the beaker containing with 100 ml of the methanol solution, then 5.5 g of ZIF-67 is added into the beaker to perform the ultrasonic dispersion process for 2 h, then the ZIF-67 is self-assembled on the surface of the lotus leaf after standing for 24 h, and then is placed in the air blast oven after self-assembling on the surface of the pretreated lotus leaf carrier for drying at a temperature of 210° C. for 9 h, to obtain the lotus leaf derived biochar loaded with ZIF-67.

Embodiment 3

The embodiment 3 includes steps S1 and S2.

In step S1, the pretreated steps for a lotus leaf carrier are as follows. Specifically, the lotus leaf is dried at a temperature of 90° C. for 1 h to remove moisture therein, after drying, the lotus leaf is cut to obtain square thin slices, each of which has a thickness of 1-3 mm, a length of 3 cm, and an effective area of 9 cm², and thus the pretreated lotus leaf carrier is obtained.

In step S2, 3.5 g of pretreated lotus leaf carrier obtained from S1 is added into the beaker containing with 100 ml of the methanol solution, then 6 g of ZIF-67 is added into the beaker to perform the ultrasonic dispersion process for 1 h, then the ZIF-67 is self-assembled on the surface of the lotus leaf after standing for 18 h, and then is placed in the air blast oven after self-assembling on the surface of the pretreated lotus leaf carrier for drying at a temperature of 220° C. for 7 h, to obtain the lotus leaf derived biochar loaded with ZIF-67.

Embodiment 4

The embodiment provides an application method of lotus leaf derived biochar loaded with ZIF-67 in degradation of an antibiotic, the LLZ obtained from embodiment 1 is used as a catalyst, and peroxymonosulfate (PMS) is used as an oxidant, and an advanced oxidation technology based on sulfate radical anion is used to degrade wastewater including refractory levofloxacin.

The LLZ with a concentration of 0.5 gram per liter (g/L) and the PMS with a concentration of 150 milligram per liter (mg/L) are sequentially added in 100 ml of wastewater including the levofloxacin. Specifically, a potential of hydrogen (pH) of the wastewater including the levofloxacin is 6.43, a concentration of the levofloxacin is 5 mg/L. Under an action of magnetic stirring, the advanced oxidation technology based on sulfate radical anion is used to degrade the wastewater including the levofloxacin, the catalyst (i.e., the LLZ) is a square thin slice with a thickness of 1-3 mm, a length of 3 cm, and an effective area 9 cm², and a processing time is 16 min. Sampling analysis is performed at different times during a processing reaction, and a change of the concentration of the levofloxacin at different times is determined by using a high performance liquid chromatography (HPLC).

Figure 2:
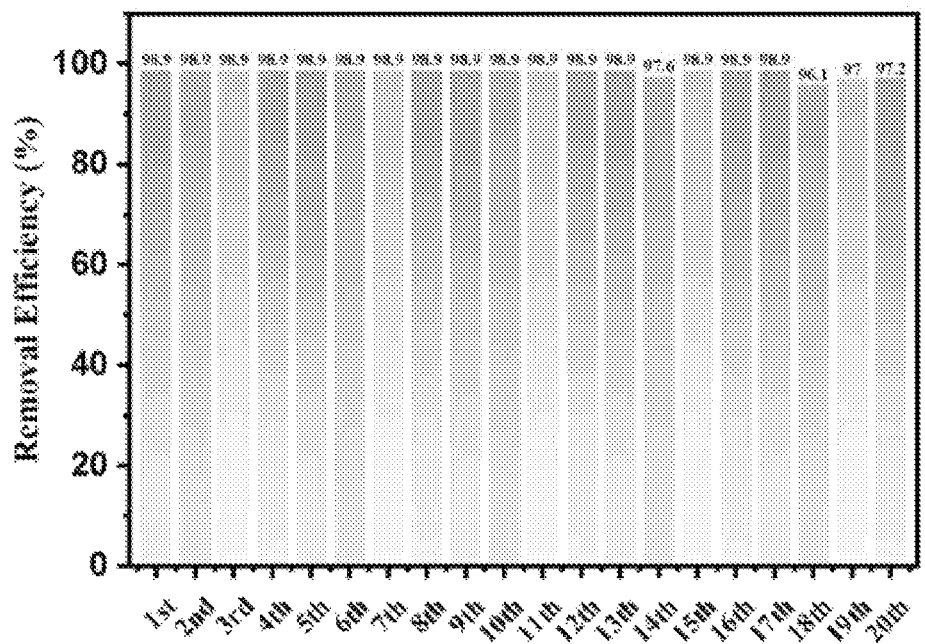
FIG. 2 illustrates a histogram of 20 times of degradation of levofloxacin according to the embodiment 4 of the disclosure.

As shown in FIG. 1, a removal efficiency of the levofloxacin is as high as 98.9 percent (%) after degrading the levofloxacin with the PMS activated by the LLZ for 16 min, and an excellent processing effect of the PMS activated by the LLZ on the wastewater including the levofloxacin is proved. Moreover, reusability of the LLZ is examined. As shown in FIG. 2, after the LLZ is used to continuously activate the PMS for 20 times, when the LLZ is further used to degrade the levofloxacin with the concentration of 5 mg/L, a removal effect of the levofloxacin has no obvious decrease. Therefore, the LLZ has high reusability when continuously activating the PMS to degrade the wastewater including the levofloxacin.

Embodiment 5

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

The LLZ with the concentration of 0.5 g/L and the PMS with a concentration of 150 mg/L are sequentially added in 100 ml of the wastewater including the levofloxacin. Specifically, the pH of the wastewater including the levofloxacin is 3, the concentration of the levofloxacin is 5 mg/L. Under the action of magnetic stirring, the advanced oxidation technology based on sulfate radical anion is used to degrade the wastewater including the levofloxacin, the catalyst is a square thin slice with a thickness of 1-3 mm, a length of 3 cm, and an effective area of 9 cm², and the processing time is 16 min. Sampling analysis is performed at different times during the processing reaction, and the change of the concentration of the levofloxacin at different times is determined by using the HPLC.

Embodiment 6

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

The LLZ with the concentration of 0.5 g/L and the PMS with the concentration of 150 mg/L are sequentially added in 100 ml of the wastewater including the levofloxacin. Specifically, the pH of the wastewater including the levofloxacin is 5, the concentration of the levofloxacin is 5 mg/L. Under the action of magnetic stirring, the advanced oxidation technology based on sulfate radical anion is used to degrade the wastewater including the levofloxacin, the catalyst is a square thin slice with a thickness of 1-3 mm, a length of 3 cm, and an effective area of 9 cm², and the processing time is 16 min. Sampling analysis is performed at different times during the processing reaction, and the change of the concentration of the levofloxacin at different times is determined by using the HPLC.

Embodiment 7

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

The LLZ with the concentration of 0.5 g/L and the PMS with the concentration of 150 mg/L are sequentially added in 100 ml of the wastewater including the levofloxacin. Specifically, the pH of the wastewater including the levofloxacin is 7, the concentration of the levofloxacin is 5 mg/L. Under the action of magnetic stirring, the advanced oxidation technology based on sulfate radical anion is used to degrade the wastewater including the levofloxacin, the catalyst is a square thin slice with a thickness of 1-3 mm, a length of 3 cm, and an effective area of 9 cm², and the processing time is 16 min. Sampling analysis is performed at different times during the processing reaction, and the change of the concentration of the levofloxacin at different times is determined by using the HPLC.

Embodiment 8

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

The LLZ with the concentration of 0.5 g/L and the PMS with the concentration of 150 mg/L are sequentially added in 100 ml of the wastewater including the levofloxacin. Specifically, the pH of the wastewater including the levofloxacin is 9, the concentration of the levofloxacin is 5 mg/L. Under the action of magnetic stirring, the advanced oxidation technology based on sulfate radical anion is used to degrade the wastewater including the levofloxacin, the catalyst is a square thin slice with a thickness of 1-3 mm, a length of 3 cm, and an effective area of 9 cm², and the processing time is 16 min. Sampling analysis is performed at different times during the processing reaction, and the change of the concentration of the levofloxacin at different times is determined by using the HPLC.

Figure 3:
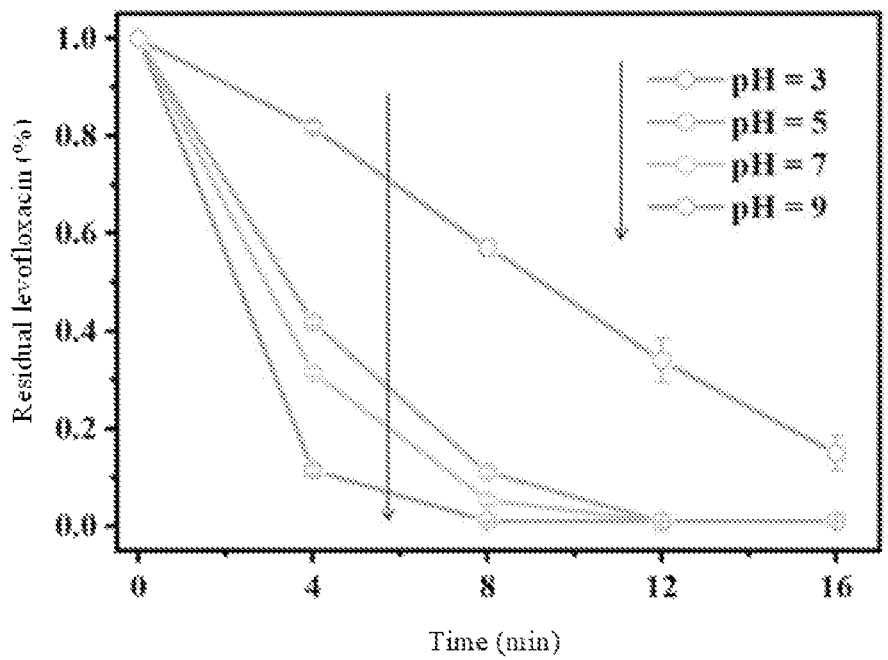
FIG. 3 illustrates a schematic diagram of degradation results of levofloxacin in different potential of hydrogen (pH) conditions according to an embodiment of the disclosure.

Processing results of the embodiments 5-8 are shown in FIG. 3, it can be seen from FIG. 3, after degrading the levofloxacin with the PMS activated by the LLZ within a pH range of 3-9 for 16 min, the removal efficiencies of the levofloxacin are 75.1%, 98.9%, 98.9% and 98.9%, respectively, and an excellent processing effect of the PMS activated by the LLZ on the wastewater including the levofloxacin within a wide pH range is proved.

Embodiment 9

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

Sodium chloride with a concentration of 10 millimoles per liter (mM) is added in 100 ml of the wastewater including the levofloxacin, the LLZ with the concentration of 0.5 g/L and the PMS with the concentration of 150 mg/L are sequentially added after dissolution of the sodium chloride. Specifically, the pH of the wastewater including the levofloxacin is 7, the concentration of the levofloxacin is 5 mg/L. Under the action of magnetic stirring, the advanced oxidation technology based on sulfate radical anion is used to degrade 100 ml of the wastewater (pH=6.43) including the levofloxacin with the concentration of 5 mg/L under an interference of chloride ion ($Cl^-$), the catalyst is a square thin slice with a thickness of 1-3 mm, a length of 3 cm, and an effective area of 9 cm², and the processing time is 16 min. Sampling analysis is performed at different times during the processing reaction, and the change of the concentration of the levofloxacin at different times is determined by using the HPLC.

Embodiment 10

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

Sodium sulfate with a concentration of 10 mM is added in 100 ml of the wastewater including the levofloxacin, the LLZ with the concentration of 0.5 g/L and the PMS with the concentration of 150 mg/L are sequentially added after dissolution of the sodium sulfate. Specifically, the pH of the wastewater including the levofloxacin is 6.43, the concentration of the levofloxacin is 5 mg/L. Under the action of magnetic stirring, the advanced oxidation technology based on sulfate radical anion is used to degrade the wastewater including the levofloxacin under an interference of sulfate radical ion ($SO_4^{2-}$), the catalyst is a square thin slice with a thickness of 1-3 mm, a length of 3 cm, and an effective area of 9 cm², and the processing time is 16 min. Sampling analysis is performed at different times during the processing reaction, and the change of the concentration of the levofloxacin at different times is determined by using the HPLC.

Embodiment 11

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

Sodium nitrate with a concentration of 10 mM is added in 100 ml of the wastewater including the levofloxacin, the LLZ with the concentration of 0.5 g/L and the PMS with the concentration of 150 mg/L are sequentially added after dissolution of the sodium nitrate. Specifically, the pH of the wastewater including the levofloxacin is 6.43, the concentration of the levofloxacin is 5 mg/L. Under the action of magnetic stirring, the advanced oxidation technology based on sulfate radical anion is used to degrade the wastewater including the levofloxacin under an interference of nitrate ion ($NO_3^-$), the catalyst is a square thin slice with a thickness of 1-3 mm, a length of 3 cm, and an effective area of 9 cm², and the processing time is 16 min. Sampling analysis is performed at different times during the processing reaction, and the change of the concentration of the levofloxacin at different times is determined by using the HPLC.

Embodiment 12

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

Disodium hydrogen phosphate with a concentration of 10 mM is added in 100 ml of the wastewater including the levofloxacin, the LLZ with the concentration of 0.5 g/L and the PMS with the concentration of 150 mg/L are sequentially added after dissolution of the disodium hydrogen phosphate. Specifically, the pH of the wastewater including the levofloxacin is 6.43, the concentration of the levofloxacin is 5 mg/L. Under the action of magnetic stirring, the advanced oxidation technology based on sulfate radical anion is used to degrade the wastewater including the levofloxacin under an interference of dihydrogen phosphate ion ($H_2PO_4^-$), the catalyst is a square thin slice with a thickness of 1-3 mm, a length of 3 cm, and an effective area of 9 cm², and the processing time is 16 min. Sampling analysis is performed at different times during the processing reaction, and the change of the concentration of the levofloxacin at different times is determined by using the HPLC.

Figure 4:
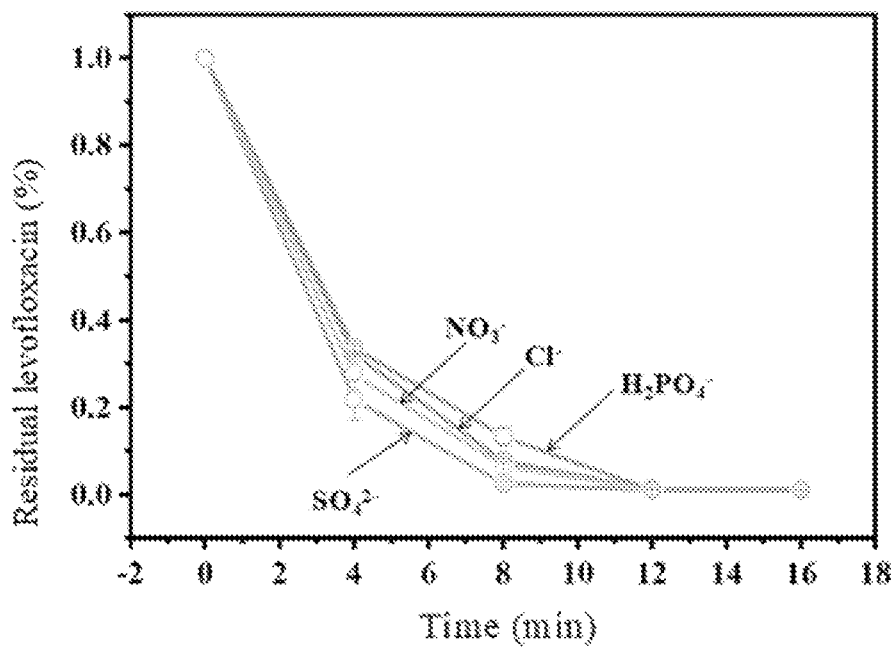
FIG. 4 illustrates a schematic diagram of degradation results of levofloxacin under interference of different anions according to an embodiment of the disclosure.

Processing results of the embodiments 9-12 are shown in FIG. 4. As shown in FIG. 4, after degrading the levofloxacin with the PMS activated by the LLZ under interference of different anions for 16 min, the removal efficiencies of the levofloxacin are 98.9%, 98.9%, 98.9% and 98.9%, respectively, and an excellent processing effect of the PMS activated by the LLZ on the wastewater including the levofloxacin under the interference of different anions is proved.

Embodiment 13

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

The LLZ with a concentration of 2 g/L and the PMS with a concentration of 50 mg/L are sequentially added in 100 ml of the wastewater including the levofloxacin. Specifically, the pH of the wastewater including the levofloxacin is 6.43, the concentration of the levofloxacin is 3 mg/L. Under the action of magnetic stirring, the advanced oxidation technology based on sulfate radical anion is used to degrade the wastewater including the levofloxacin, the catalyst is a square thin slice with a thickness of 1-3 mm, a length of 6 cm, and an effective area of 36 cm$^2$, and the processing time is 16 min.

Embodiment 14

The embodiment provides an application method of lotus leaf derived biochar loaded with ZIF-67 in degradation of an antibiotic, the LLZ obtained from the embodiment 1 is used as the catalyst, and the PMS is used as the oxidant, and the advanced oxidation technology based on sulfate radical anion is used to degrade the wastewater including the refractory levofloxacin.

The LLZ with a concentration of 4.4 g/L and the PMS with the concentration of 100 mg/L are sequentially added in 2500 ml of the wastewater including the levofloxacin. Specifically, the pH of the wastewater including the levofloxacin is 6.43, the concentration of the levofloxacin is 1 mg/L. Under the action of magnetic stirring, the advanced oxidation technology based on sulfate radical anion is used to degrade the wastewater including the levofloxacin, the catalyst is a square thin slice with a thickness of 1-3 mm, a diameter of 50 cm, and an effective area of 1963.5 cm$^2$, and the processing time is 16 min.

A density functional theory (DFT) calculation and a liquid chromatography-mass spectrometry (LC-MS) are combined to explain a possible reaction mechanism of a lotus leaf derived biochar loaded with ZIF-67 and peroxymonosulfate (LLZ/PMS) system in the disclosure.

Figure 5:
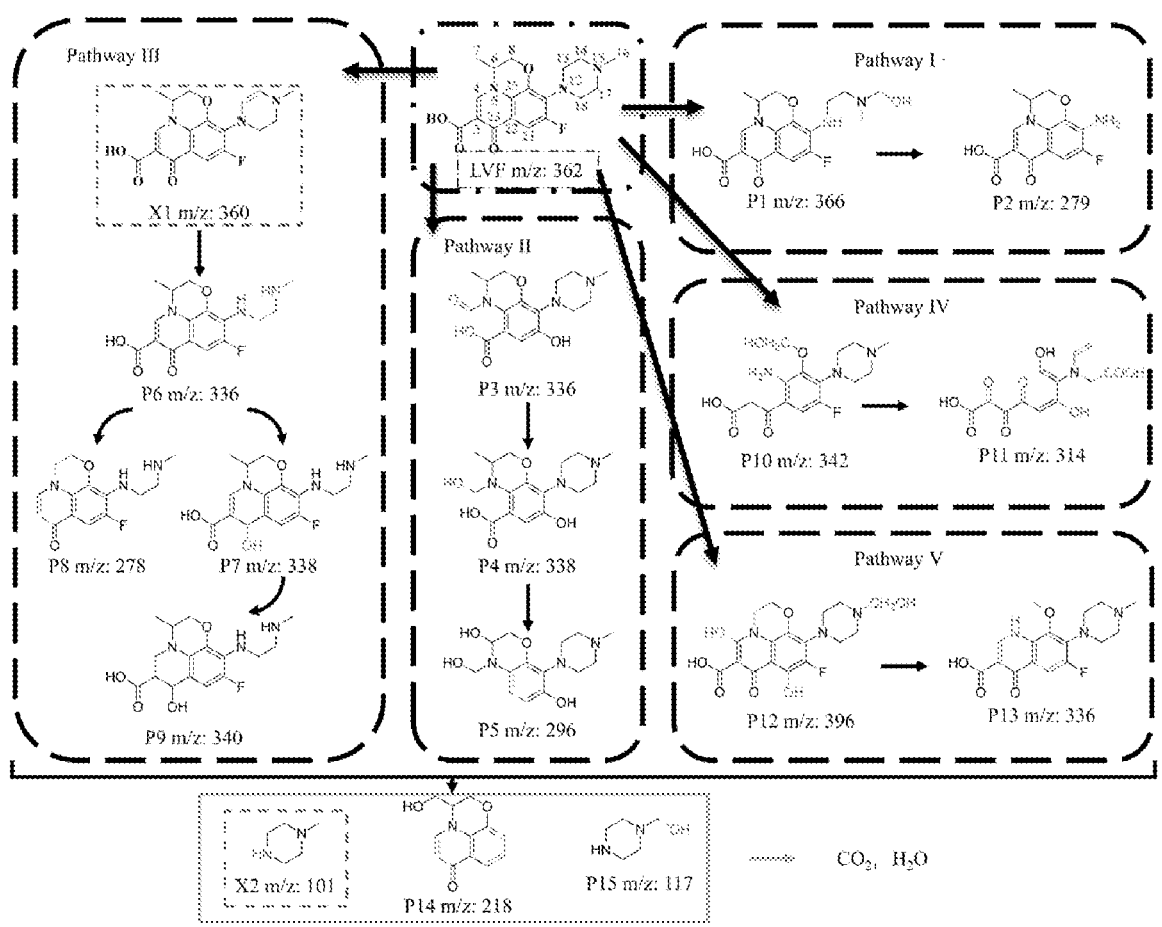
FIG. 5 illustrates a schematic diagram of degradation pathways of levofloxacin according to an embodiment of the disclosure.

The DFT calculation and the LC-MS analysis are combined to infer degradation pathways of the levofloxacin, and the degradation pathways of the levofloxacin mainly includes the following pathways, as shown in FIG. 5. In a pathway I, a highly active N12 site in the levofloxacin is preferentially attacked by a reactive oxygen species (ROS) to perform a depiperazination to generate an intermediate product P1. Then, piperazinyl is performed a splitting decomposition to generate an intermediate product P2. In a pathway II, —C22-C25- of the levofloxacin is attacked and performed a splitting decomposition, and fluoro group of —C22-C25- is replaced by hydroxyl to generate P3. Carbonyl of the P3 is replaced by hydroxyl to generate P4. Methyl of the P4 is replaced by hydroxyl and performed decarboxylation to generate P5. In a pathway III, the levofloxacin is performed a dehydrogenation to generate X1. Then an olefin structure (—C13=C14-) of the X1 is preferentially attacked by a singlet oxygen (1O2) to generate P6. The P6 is performed a decarboxylation and a demethylation to generate P8. Carbonyl of the P6 is replaced by hydroxyl to generate P7. And the P7 is downgraded to P9. In a pathway IV, —N5-C6- and —C6-C8- are attacked to generate P10, hydroxyl and keto group of the P11 may come from a degradation of peroxide intermediate in the P10. In a pathway V, the levofloxacin is performed a dealkylation to generate P12. C6 and C7 of the P12 are attacked to generate P13. After that, the levofloxacin (LVF) is decomposed as small molecules (P14-P15), and is finally mineralized as carbon dioxide ($CO_2$) and dihydrogen oxide ($H_2O$).

Although embodiments of the disclosure are described, basic creative concepts are informed of those skilled in the art, additional changes and modifications can be made for the embodiments. Therefore, attached claims are intended to be interpreted as including preferred embodiments and all changes and modifications falling within a scope of the disclosure.

Obviously, various modifications and variants without departing from a spirit and the scope of the disclosure can be made by those skilled in the art for the disclosure. If the modifications and variations of the disclosure fall within the scope of the claims and their equivalents, the disclosure is also intended to include the modifications and variations.

What is claimed is:

1. A preparation method of lotus leaf derived biochar loaded with zeolite-imidazolate framework-67 (ZIF-67), comprising:
   drying a lotus leaf at a temperature of 50-90 Celsius degree (° C.) for 1-5 hours (h) to remove moisture therein to thus obtain a dried lotus leaf, and cutting the dried lotus leaf to obtain a pretreated lotus leaf carrier; and
   adding the pretreated lotus leaf carrier and ZIF-67 to methanol as solvent, to obtain a solution, performing an ultrasonic dispersion process on the solution, standing the solution after performing the ultrasonic dispersion process to perform a self-assembly reaction to thus obtain a reacted solution, and drying the reacted solution to obtain the lotus leaf derived biochar loaded with the ZIF-67, wherein a drying temperature for drying the reacted solution is 200-220° C., and a drying time for drying the reacted solution is 4-9 h.

2. The preparation method of lotus leaf derived biochar loaded with ZIF-67 as claimed in claim 1, wherein a ratio of the pretreated lotus leaf carrier:the ZIF-67:the methanol is 2.5-3.5 grams (g):5-6 g:100 milliliters (ml), and a standing time is 12-24 h.

3. The preparation method of lotus leaf derived biochar loaded with ZIF-67 as claimed in claim 1, wherein an ultrasonic dispersion time is 0.5-2 h.

4. A lotus leaf derived biochar loaded with ZIF-67, wherein the lotus leaf derived biochar loaded with ZIF-67 is obtained by using the preparation method of lotus leaf derived biochar loaded with ZIF-67 as claimed in claim 1.

5. An application method of lotus leaf derived biochar loaded with ZIF-67 in degradation of an antibiotic, the lotus leaf derived biochar loaded with ZIF-67 being the lotus leaf derived biochar loaded with ZIF-67 as claimed in claim 4 and the application method comprising:

degrading, by using an advanced oxidation technology based on sulfate radical anion, wastewater comprising the antibiotic by using the lotus leaf derived biochar loaded with ZIF-67 as a catalyst, and using peroxymonosulfate as an oxidant.

6. The application method of lotus leaf derived biochar loaded with ZIF-67 in degradation of an antibiotic as claimed in claim 5, wherein a ratio of the lotus leaf derived biochar loaded with ZIF-67:the peroxymonosulfate:antibiotic is 0.5-2 grams per liter (g/L):50-150 milligrams per liter (mg/L):1-5 mg/L.

7. The application method of lotus leaf derived biochar loaded with ZIF-67 in degradation of an antibiotic as claimed in claim 6, wherein the antibiotic is levofloxacin, and a value of potential of hydrogen (pH) of the wastewater comprising the antibiotic is 3-9.

8. The application method of lotus leaf derived biochar loaded with ZIF-67 in degradation of an antibiotic as claimed in claim 5, wherein a thickness of the lotus leaf derived biochar loaded with ZIF-67 is 1-3 millimeters (mm), and an effective area of the lotus leaf derived biochar loaded with ZIF-67 is 9-1963.5 square centimeters ($cm^2$).

\* \* \* \* \*